US012283765B2

(12) United States Patent
Hashiguchi

(10) Patent No.: US 12,283,765 B2
(45) Date of Patent: Apr. 22, 2025

(54) ELECTRICAL CONNECTOR WHEREIN THE DISTANCE BETWEEN TERMINALS ON A STRIP IS SMALL

(71) Applicant: Japan Aviation Electronics Industry, Limited, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 374 days.

(21) Appl. No.: 17/868,406

(22) Filed: Jul. 19, 2022

(65) Prior Publication Data

US 2023/0094811 A1 Mar. 30, 2023

(30) Foreign Application Priority Data

Sep. 21, 2021 (JP) ................................ 2021-152970

(51) Int. Cl.
*H01R 12/71* (2011.01)
*H01R 12/70* (2011.01)

(52) U.S. Cl.
CPC ....... *H01R 12/716* (2013.01); *H01R 12/7064* (2013.01)

(58) Field of Classification Search
CPC .......................... H01R 12/716; H01R 12/7064
USPC .......................................................... 439/180
See application file for complete search history.

(56) References Cited

U.S. PATENT DOCUMENTS 5,788,515 A * 8/1998 Mitra .................. H01R 13/428 439/83
9,954,312 B1 * 4/2018 Ju ........................ H01R 12/707
10,122,111 B1 * 11/2018 Ju ...................... H01R 12/7076
10,547,137 B2 * 1/2020 Chang ................ H01R 13/2442
11,088,478 B2 * 8/2021 Ho ..................... H01R 13/2435
2018/0198219 A1 * 7/2018 Ju ........................ H01R 13/112
2018/0287269 A1 * 10/2018 Ju .......................... H05K 3/366
2019/0288425 A1 * 9/2019 Ho ......................... H01R 13/08
2019/0288430 A1 * 9/2019 Ho ....................... H01R 12/712
2019/0334273 A1 * 10/2019 Hsu .................... H01R 13/2407

(Continued)

FOREIGN PATENT DOCUMENTS

CN 206461179 U * 9/2017 ............. H01R 12/52
CN 107658588 A * 2/2018 ............. H01R 12/57
CN 107968284 A * 4/2018 ........... H01R 12/716

(Continued)

*Primary Examiner* — Peter G Leigh
(74) *Attorney, Agent, or Firm* — MUNCY, GEISSLER, OLDS & LOWE, P.C.

(57) ABSTRACT

A connector is disposed on a board in a first direction and includes a housing, a contact, and a movable. The housing is provided with a bottom surface facing the board and a through hole formed along the first direction. The contact is held in the through hole and has its end portion on a board side exposed at the bottom surface via the through hole. The movable terminal is formed as a separate member from the contact, disposed at a close position to the contact in the through hole, and movable in the first direction relative to the contact. One end of the movable terminal in the first direction is fixed to the board and projects from the bottom surface in accordance with movement of the movable terminal, and a projection amount of the one end changes depending on a position of the movable terminal in the first direction.

12 Claims, 11 Drawing Sheets

(56) References Cited

U.S. PATENT DOCUMENTS

| | | | | |
|---|---|---|---|---|
| 2020/0403344 | A1* | 12/2020 | Dai | H01R 12/7076 |
| 2021/0066831 | A1* | 3/2021 | Ho | H01R 13/2435 |

FOREIGN PATENT DOCUMENTS

| | | | | | |
|---|---|---|---|---|---|
| CN | 108346875 | A | * | 7/2018 | H01R 12/7076 |
| CN | 208173836 | U | * | 11/2018 | H01R 12/72 |
| CN | 109713482 | A | * | 5/2019 | H01R 13/24 |
| CN | 110071386 | A | * | 7/2019 | H01R 12/585 |
| CN | 110718790 | B | * | 2/2021 | H01R 12/714 |
| JP | H9-505930 | | | 6/1997 | |
| WO | WO-8607204 | A1 | * | 12/1986 | H01R 12/714 |
| WO | WO95/10865 | | | 4/1995 | |

* cited by examiner

ELECTRICAL CONNECTOR WHEREIN THE DISTANCE BETWEEN TERMINALS ON A STRIP IS SMALL

BACKGROUND OF THE INVENTION

The present invention relates to a connector, particularly to a connector that is fixed to a board.

A connector that is fittable with a counter connector is, for example, fixed to (mounted on) a board with solder or the like. In addition, the connector normally includes a contact, and a housing that holds the contact (see FIG. 24, for example).

The contact comes into contact with a contact (counter contact) of the counter connector when the connector is fitted with the counter connector. The housing is, for example, provided with a through hole, in which the contact is accommodated and held. In this configuration, an end portion of the contact on the board side is exposed toward the board via the through hole, and the exposed end portion is joined to a surface of the board; the connector is thus fixed to the board.

In addition, conventional connectors include one configured such that, as shown in JP H9-505930 A (hereinafter, Patent Literature 1), a contact is movable in a through hole along a direction in which the through hole is formed (hereinafter, also referred to as first direction). In the connector (hereafter, connector 1) of Patent Literature 1, as shown in FIG. 24, a contact 5 is accommodated in a through hole 3 (channel) formed in a housing 2, and an end surface of the contact 5 on the board side constitutes a bonding surface 4 to bond to the board.

In the connector 1, the contact 5 can move in the through hole 3 along the first direction, and in accordance with movement of the contact 5, the bonding surface 4 shifts in position. Since the bonding surface 4 is shiftable in position as described above, when the board has warpage or curvature (hereinafter, referred to as "warpage or the like"), for example, the position of the bonding surface 4 can be adjusted to follow the warpage or the like. Accordingly, the connector 1 can be suitably fixed to (mounted on) a surface of the board.

In the meantime, when the contact 5 moves in the first direction, the contact position (contact point) of the contact 5 with a counter contact changes. For instance, when the contact 5 moves toward the board, the contact point also moves toward the board to be positioned away from a counter connector in a connector fitting state. Under the circumstances, the connector 1 described above is required to ensure a longer length of a range (effective contact length) in which the contacts are in contact with each other.

In order to ensure a long effective contact length, it is necessary to design the contact 5 to have a longer length (contact length) in the first direction and, accordingly, design the counter contact to have a longer length in the first direction. Hence, the connector and a connector assembly in which the connector and the counter connector are assembled become large in size, and their larger sizes make it difficult to mount them in a product.

SUMMARY OF INVENTION

The present invention has been made in view of the above circumferences and is aimed at solving the conventional problem described above, specifically, providing a connector which can be suitably fixed to a board and whose size is further reduced.

In order to attain the object above, the connector of the invention is a connector that is disposed on a board in a first direction and fixed to the board, the connector comprising: a housing provided with a bottom surface facing the board and a through hole formed along the first direction, a contact held in the through hole and having its end portion on a board side in the first direction exposed at the bottom surface via the through hole, and a movable terminal formed as a separate member from the contact, disposed at a close position to the contact in the through hole, and movable in the first direction relative to the contact, wherein one end of the movable terminal in the first direction is configured so as to be fixed to the board and to project from the bottom surface in accordance with movement of the movable terminal, and wherein a projection amount of the one end changes depending on a position of the movable terminal in the first direction.

The connector of the invention configured as above allows the movable terminal formed as a separate member from the contact to move in the first direction within the through hole. The one end of the movable terminal projects from the bottom surface of the housing in accordance with movement of the movable terminal, and a projection amount of the one end changes depending on a position of the movable terminal. With this configuration, even when the board has warpage or the like, the connector can follow the warpage or the like to be suitably fixed to the board by moving the movable terminal. In addition, in the connector of the invention, the connector itself does not move so as not to cause the contact point to shift in position in accordance with movement of the contact. Accordingly, it is not necessary to design the contact to have a longer length in consideration of positional shift of the contact point, and the connector can be thus reduced in size.

DETAILED DESCRIPTION OF THE INVENTION

A connector according to an embodiment of the invention is described below with reference to a configuration example shown in the appended drawings.

The embodiment described below is only an example presented for easy understanding of the invention, and the invention is by no means limited thereto. In other words, the invention may be modified or improved from the embodiment below without departing from the scope and spirit of the invention.

The materials, shapes, design dimensions and other factors of components constituting the connector of the invention can be determined depending on the application of the invention, the state of the art at the time when the invention is carried out, and other conditions. Needless to say, the invention includes its equivalents.

In addition, in the following description, three directions intersecting orthogonally to one another are defined as an X direction, a Y direction and a Z direction, with the X direction, the Y direction and the Z direction coinciding with a lateral width direction of the connector, a front-back direction of the connector, and a vertical direction of the connector, respectively. The Z direction corresponds to a first direction of the invention, and the X direction and the Y direction correspond to a second direction of the invention. Further, the Z direction corresponds to a fitting direction in which the connector and a counter connector are fitted with each other.

In the following explanations regarding shapes, positions and the like of the respective portions of the connector, their shapes, positions and the like when the connector is viewed are described, with the +Z side being an upper side of the connector and the −Z side being a lower side of the connector, unless otherwise noted. The upper side, i.e., +Z side is a side on which the counter connector is situated when viewed in the Z direction from the connector.

In this description, "plan view" means a view from an upper side in the Z direction, "side view" a view from one direction in the X direction, and "front view" a view from a front side in the Y direction.

In this description, meaning of the terms "vertical," "orthogonal" or "parallel" encompasses an error range generally allowed in the technical field of the connector and includes the cases where a shift within a range of less than a few degrees (e.g., 2 to 3 degrees) with respect to an exact verticality, orthogonality or parallel is present.

For convenience of description, in the following description, fitting of the connector to a counter connector is called "connector fitting," and the state where the connector is fitted with the counter connector is called "connector fitting state."

<<Basic Configurations of Connector and Counter Connector>>

Figure 7:
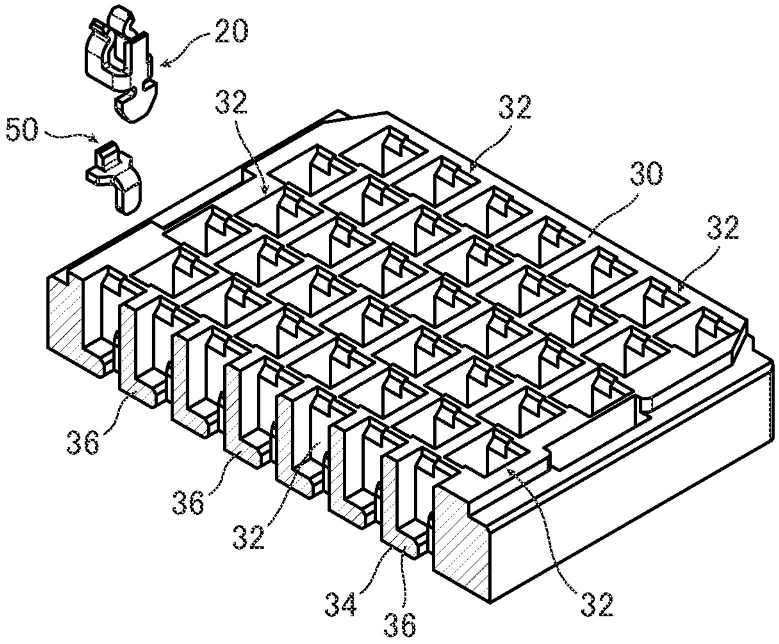
FIG. 7 is a perspective view showing a contact, a movable terminal, and part of a housing according to the embodiment of the present invention.
Figure 8:
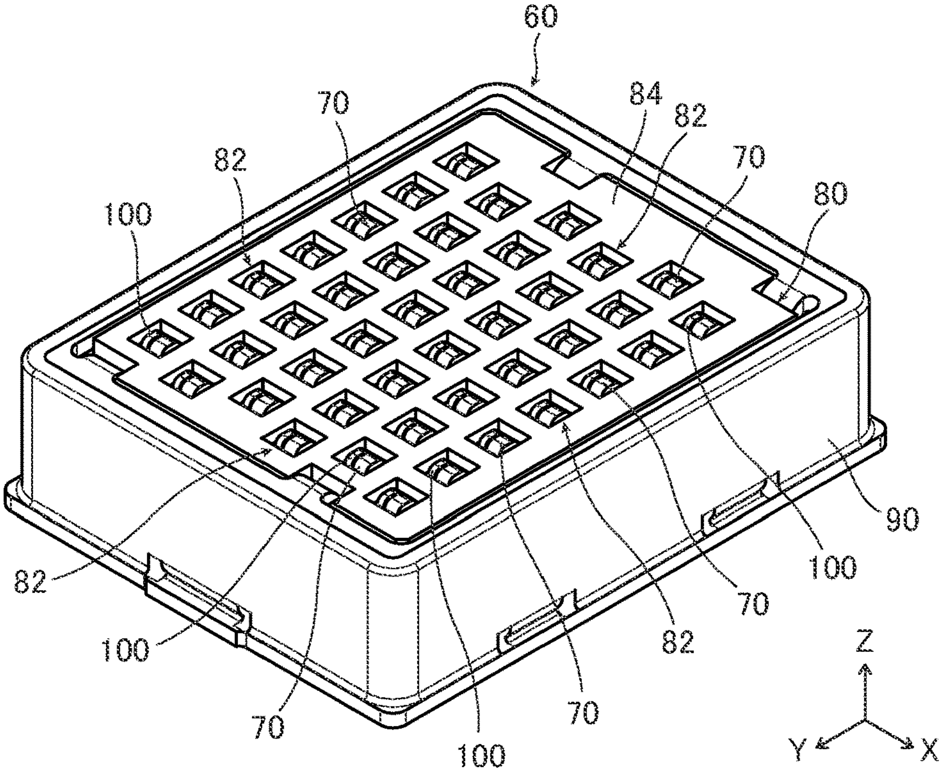
FIG. 8 is a perspective view of a counter connector.
Figure 9:
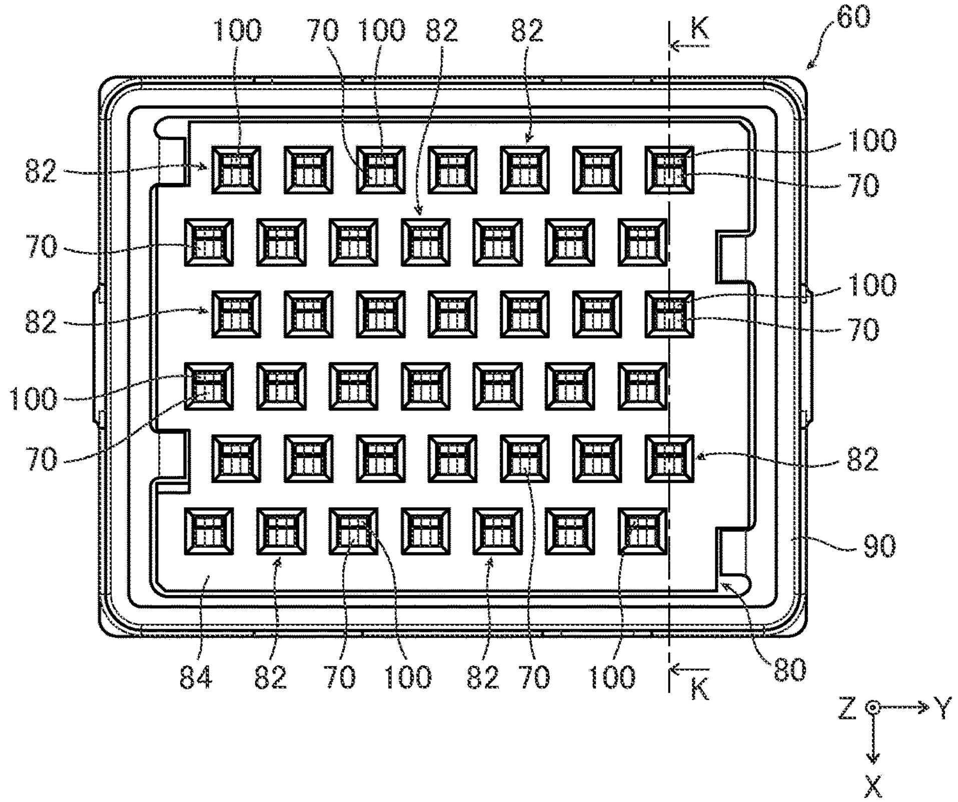
FIG. 9 is a plan view of the counter connector.
Figure 10:
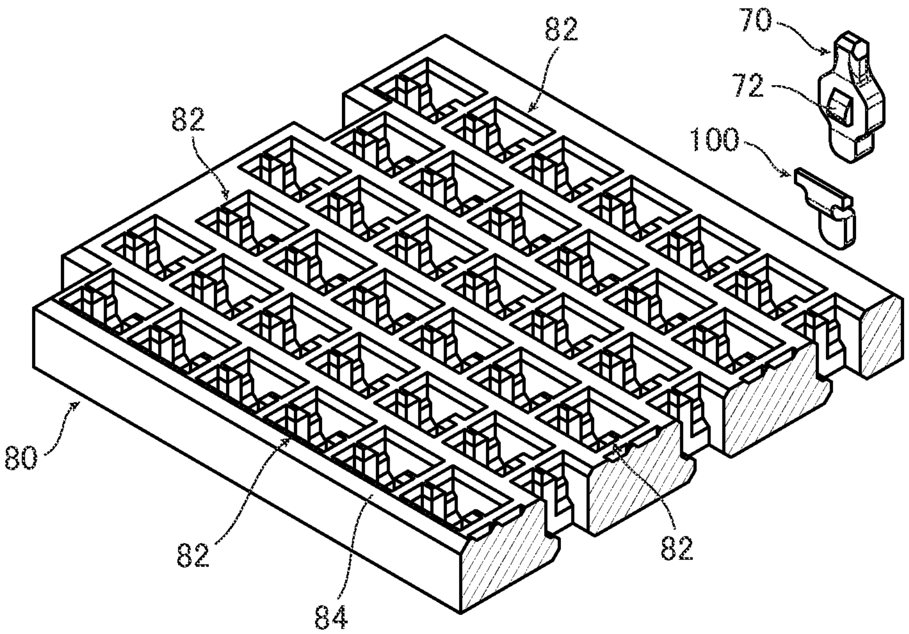
FIG. 10 is a perspective view showing a contact, a movable terminal, and part of a housing of the counter connector.
Figure 11:
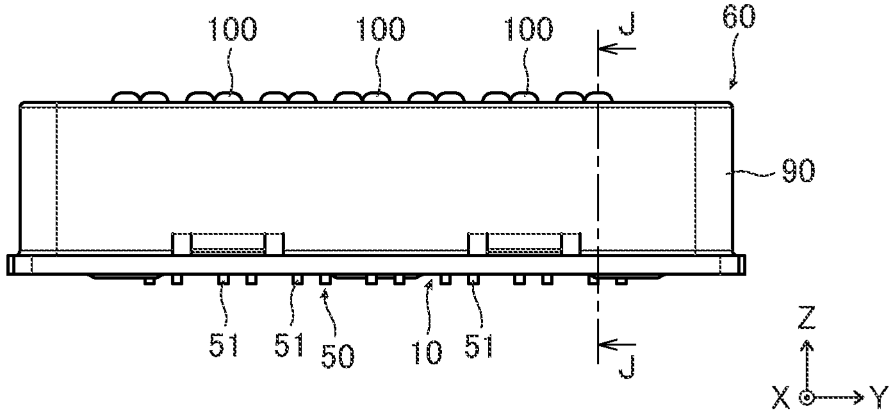
FIG. 11 is a side view showing the connector fitted with the counter connector.
Figure 12:
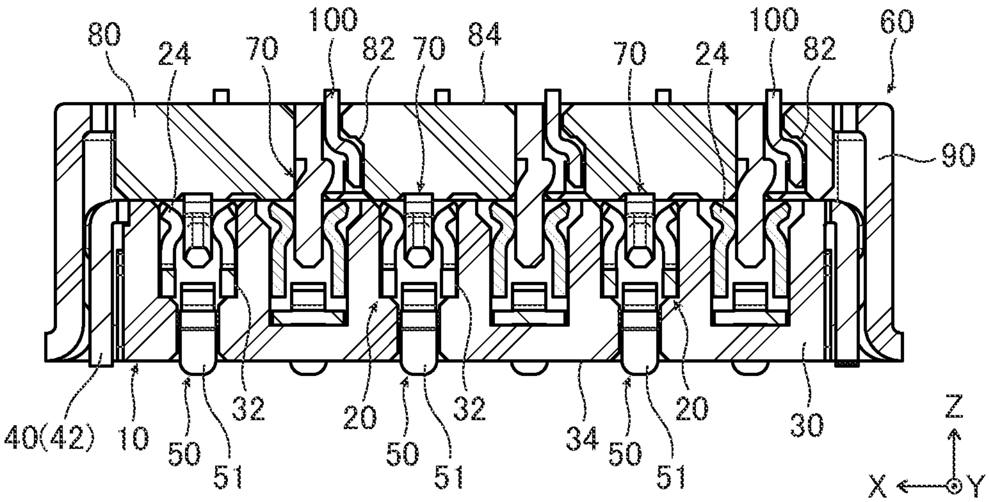
FIG. 12 is a view showing a cross-section taken along J-J in FIG. 11.

The basic configurations of a connector (hereinafter, connector 10) according to an embodiment of the invention and a counter connector 60 are described with reference to FIGS. 1 to 12. FIGS. 1 to 7 are views showing a configuration example of the connector 10. FIGS. 8 to 10 are views showing a configuration example of the counter connector 60. FIGS. 11 and 12 are views showing the connector 10 fitted with the counter connector 60, and FIG. 12 is a view showing a cross-section taken along J-J in FIG. 11. The cross-section J-J is a cross-section (XZ plane) passing contacts 20 and counter contacts 70.

The connector 10 and the counter connector 60 are a receptacle connector and a plug connector, respectively, that can be fitted with each other in the Z direction. Each of the connectors is fixed to (mounted on) a board while being in contact with the board, specifically, a pad (conductive pattern) of the board. The board is disposed vertically to the Z direction in a normal state with no warpage or the like.

In the following embodiment, the connector 10, i.e., the inventive product is a receptacle connector, while the counter connector 60 is a plug connector. Meanwhile, the invention is not limited thereto, and the connector of the invention may be a plug connector, and the counter connector may be a receptacle connector.

Figure 1:
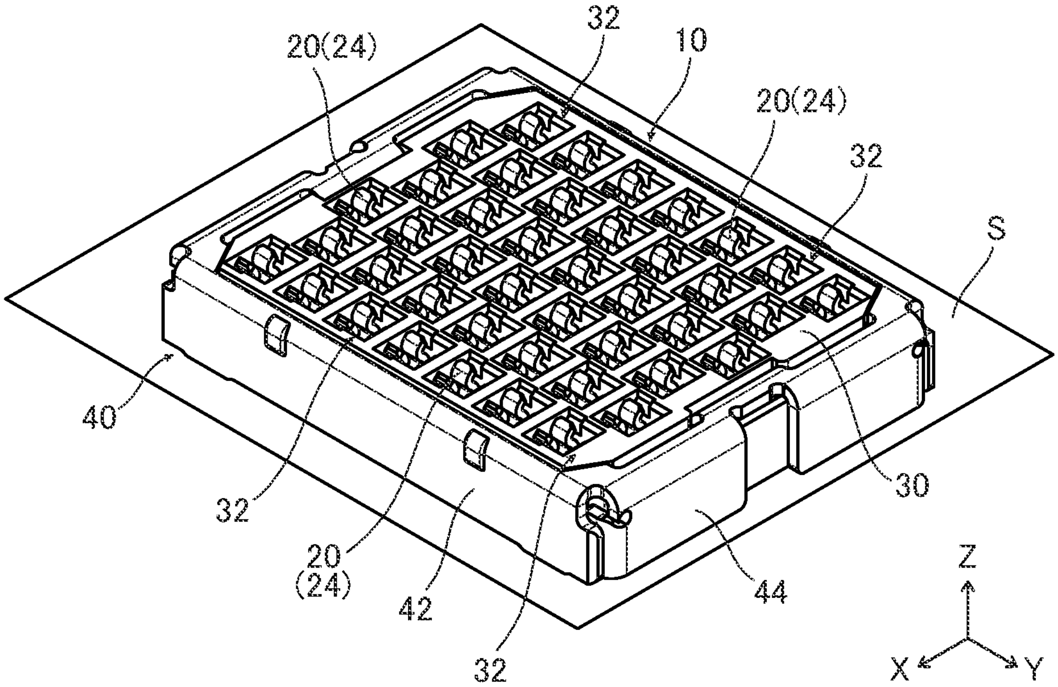
FIG. 1 is a perspective view of a connector according to an embodiment of the present invention when viewed from an upper side.

The connector 10 and the counter connector 60 are each a multi-core connector as shown in, for example, FIGS. 1 and 8, and include plural contacts. Contacts 20 of the connector 10 and contacts (counter contacts 70) of the counter connector 60 are made of a conductive material such as metal, and the number of the contacts 20 is the same as that of the counter contacts 70.

In the connector fitting state, each contact 20 is connected to the corresponding counter contact 70. The types of the contacts are not particularly limited, and, for instance, the contact 20 may be a socket-type contact as shown in FIG. 7, while the counter contact 70 may be a pin-type contact as shown in FIG. 10. In this case, in the connector fitting state, part of the contact 20 is fitted and comes into contact with the corresponding counter contact 70; specifically, a pair of pinch portions 24 provided at the +Z side end portion of the contact 20 pinch a tip end portion of the corresponding counter contact 70 (see FIG. 12).

Figure 3:
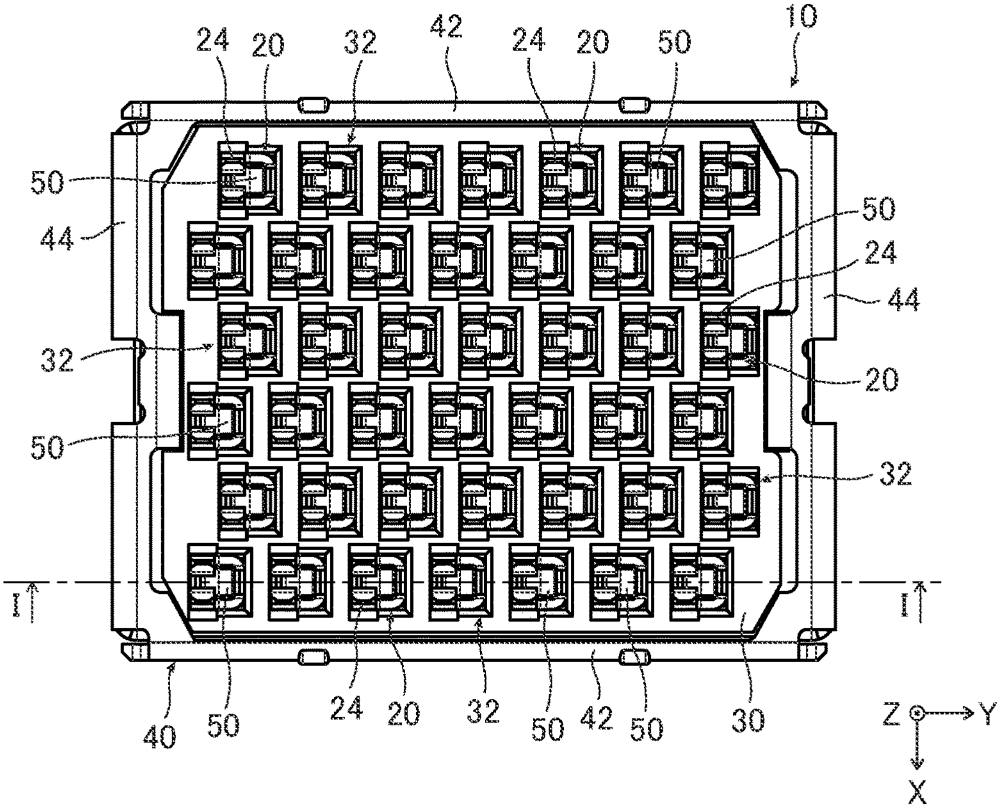
FIG. 3 is a plan view of the connector according to the embodiment of the present invention.

In the connector 10, the plural contacts 20 are held by a housing 30 as shown in FIGS. 1 and 3. The housing 30 is an insulating resin molded product (insulator) and has a substantially cuboid shape. The housing 30 is provided with as many through holes 32 formed along the Z direction as the number of contacts 20, and the contacts 20 are press-fitted in the through holes 32 one by one.

The housing 30 is assembled to a metal frame 40. The frame 40 is a rectangular frame with its upper and lower ends being opened, and the housing 30 is press-fitted in the frame 40 so as to be surrounded by the frame 40.

Similarly, in the counter connector 60, as shown in FIG. 8, the plural counter contacts 70 are held by a counter housing 80 that is an insulating resin molded product (insulator). The counter housing 80 is provided with as many through holes 82 formed along the Z direction as the number of the counter contacts 70, and the counter contacts 70 are press-fitted in the through holes 82 one by one.

The counter housing 80 has a substantially cuboid shape and is assembled to a counter frame 90 being a rectangular frame made of metal. The counter frame 90 is a rectangular frame with its upper and lower ends being opened, and the counter housing 80 is press-fitted in the counter frame 90 so as to be surrounded by the counter frame 90.

The counter frame 90 has a larger height (length in the Z direction) than that of the counter housing 80. Hence, inside the counter frame 90 with the counter housing 80 being press-fitted therein, a space is provided so as to adjoin the counter housing 80 on the −Z side of the counter housing 80. The space serves as an accommodation space for accommodating the connector 10 at the time of connector fitting, and in the connector fitting state, the connector 10 is almost entirely accommodated in the above-described space (see FIGS. 11 and 12).

The connector 10 and the counter connector 60 are each disposed on and fixed to a Z-directional surface of a board, specifically, mounted on a surface of a board with solder for the surface-mount technology (SMT). The connector 10 has its lower end (−Z side end) fixed to a board S as shown in FIG. 1, and the counter connector 60 has its upper end (+Z side end) fixed to a board. Each of the connector 10 and the counter connector 60 can be suitably fixed to (mounted on) a board while following warpage or the like even when the board has warpage or the like.

<<Detailed Configuration of Connector>>

Figure 19:
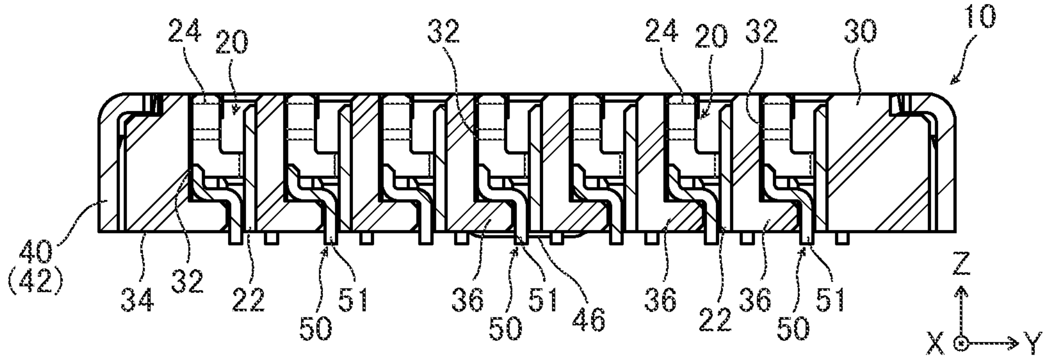
FIG. 19 is a view showing a cross-section taken along I-I in FIG. 3 and is a view showing a state where a projection amount of the movable terminal is maximum.
Figure 20:
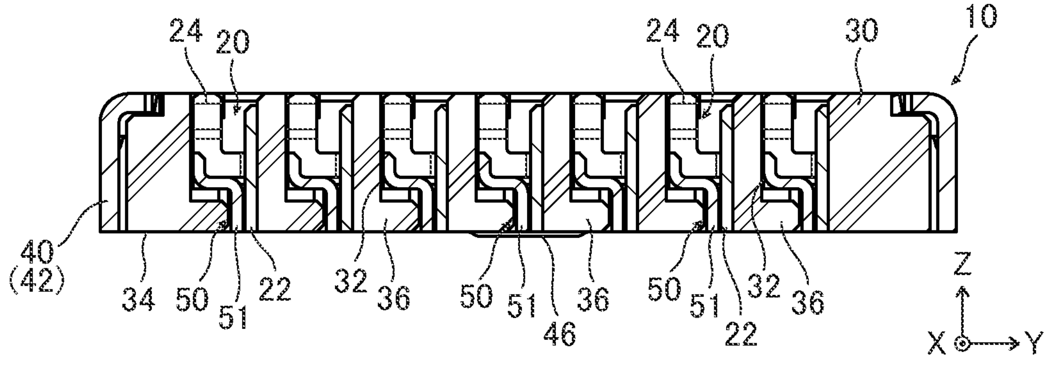
FIG. 20 is a view showing a cross-section taken along I-I in FIG. 3 and is a view showing a state where a projection amount of the movable terminal is minimum.
Figure 21:
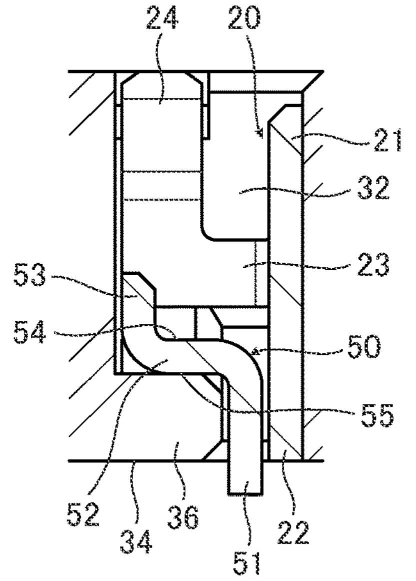
FIG. 21 is an enlarged view of a portion around the movable terminal in FIG. 19.

Next, the detailed configuration of the connector 10 is described with reference to the foregoing FIGS. 1 to 7 and FIGS. 13 to 21. FIGS. 19 and 20 each illustrate a cross-section taken along I-I in FIG. 3, i.e., cross-section (YZ plane) passing the contacts 20 and movable terminals 50. FIG. 21 is an enlarged view of a portion around the movable terminal 50 in FIG. 19.

As shown in FIGS. 1 to 7, the connector 10 includes the contacts 20, the housing 30, the frame 40, and besides movable terminals 50. The frame 40 is a rectangular frame and, as shown in FIGS. 1 to 4, includes a pair of long side portions 42 facing each other in the X direction and a pair of short side portions 44 disposed between the pair of long side portions 42 in the X direction.

Figure 2:
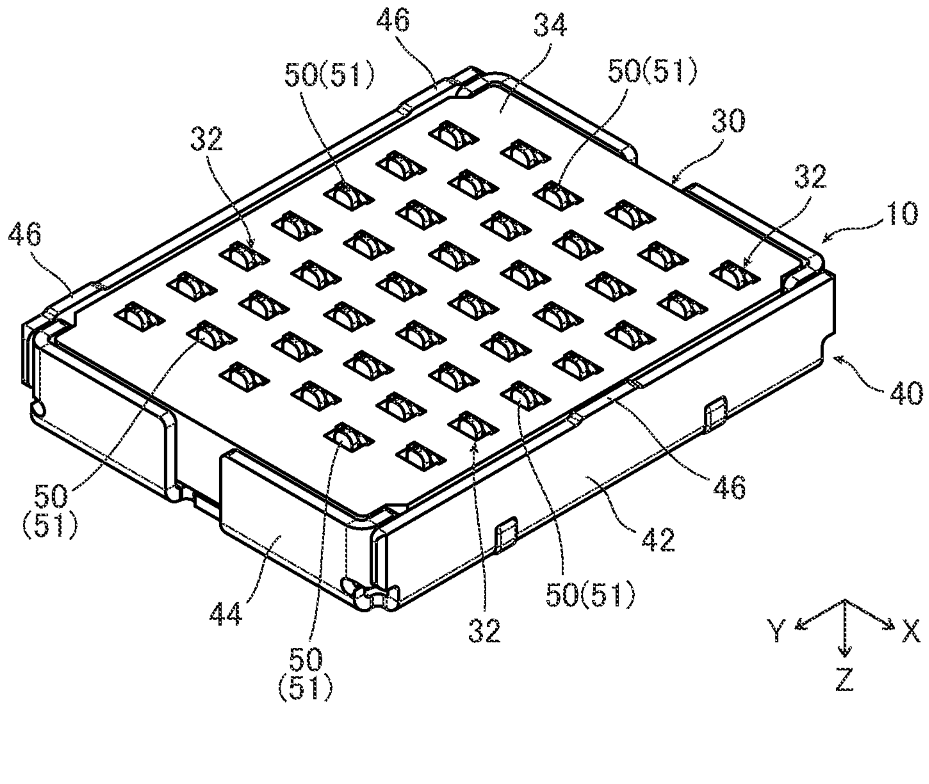
FIG. 2 is a perspective view of the connector according to the embodiment of the present invention when viewed from a lower side.
Figure 4:
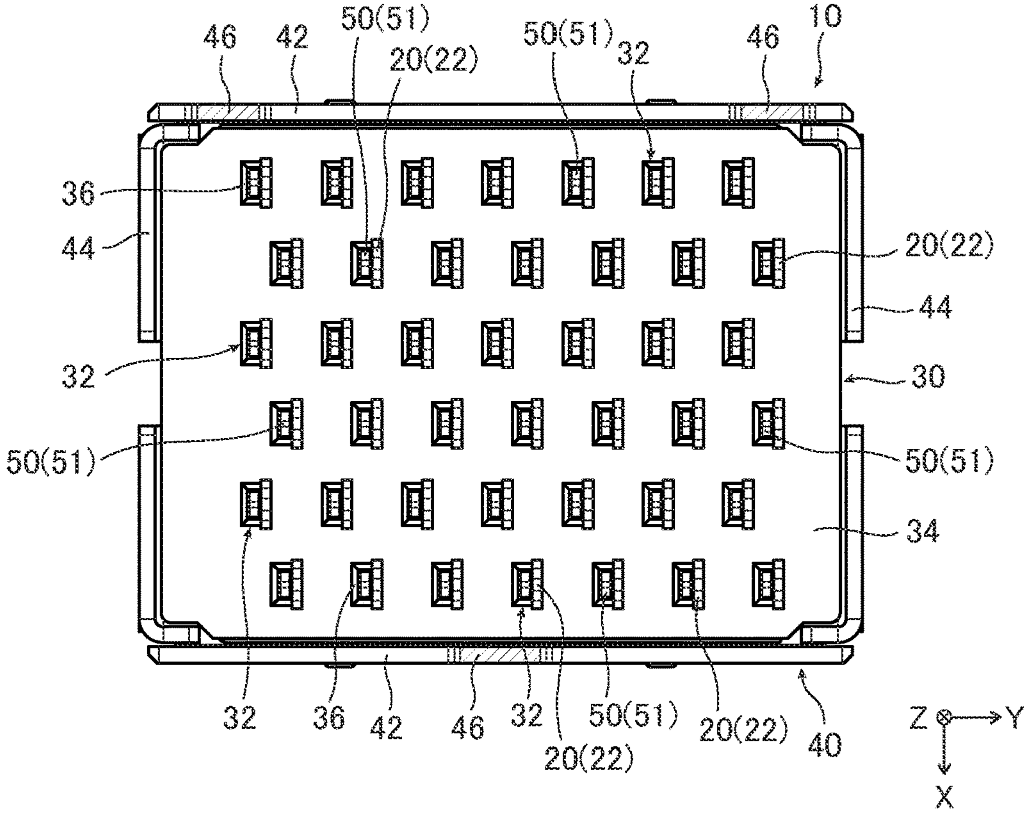
FIG. 4 is a bottom view of the connector according to the embodiment of the present invention.
Figure 5:
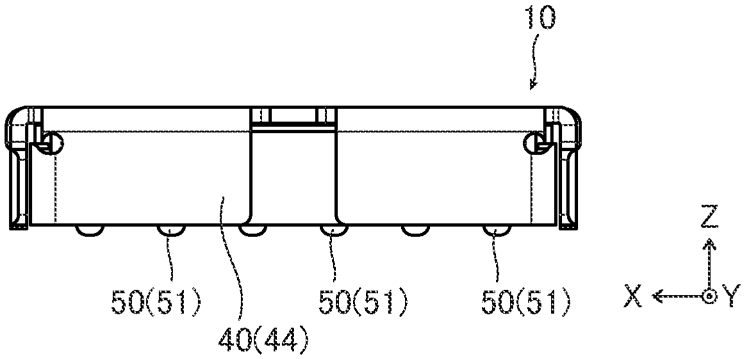
FIG. 5 is a front view of the connector according to the embodiment of the present invention.
Figure 6:
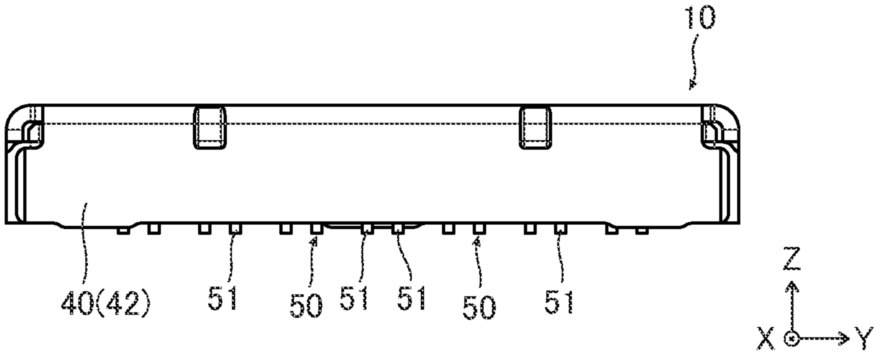
FIG. 6 is a side view of the connector according to the embodiment of the present invention.

The frame 40 works as a contact member contacting the board S at a position different from the movable terminals 50 when the connector 10 is fixed to the board S. Specifically, the lower surface (−Z side surface) of the frame 40 is fixed to (mounted on) the board S with solder. To be more specific, the lower end portion, i.e., end portion on the board side in the Z direction, of each of the pair of long side portions 42 is provided with a contact surface 46 as shown in FIGS. 2 and 4. The contact surface 46 is a planar region of the lower surface of the frame 40, the region being situated at a position slightly lower than other regions than the contact surface 46 as shown in FIG. 2, and corresponds to a hatched region in FIG. 4. The frame 40 is fixed to the board S of the connector 10 with the contact surface 46 being in contact with a surface of the board S; specifically, the lower surface of the frame 40 is joined to the surface of the board S with solder.

In the configuration shown in FIGS. 2 and 4, one contact surface 46 is provided at a Y-directional center portion of the lower surface of the long side portion 42 on the +X side, while the contact surface 46 is provided at each of Y-directional opposite end portions of the lower surface of the long side portion 42 on the −X side. This configuration allows the connector 10 to be mounted on the board S in a well-balanced manner. In the meantime, the number of the contact surfaces 46 and the position at which the contact surface 46 is disposed are not particularly limited, and, alternatively, the entire lower surface of the frame 40 may constitute the contact surface.

The housing 30 is an insulating resin molded product and, as shown in FIGS. 1 to 4, includes a bottom surface 34 facing the board S in the Z direction, and a plurality of through holes 32 formed along the Z direction. The through holes 32 are provided to correspond to the contacts 20. In other words, in the housing 30, the through hole 32 is provided for each one of the contacts 20. The bottom surface 34 is a flat surface and is, as shown in FIGS. 2 and 4, provided with a lower end (opening) of each of the through holes 32. In addition, with the housing 30 being press-fitted in the frame 40, the bottom surface 34 is situated at a position slightly sifted to the +Z side from the contact surface 46 of the frame 40 (see FIG. 2).

The through holes 32 each have a rectangular opening and are regularly disposed at substantially equal intervals in the X direction and the Y direction. Meanwhile, this is not the sole case, and the through holes 32 may be irregularly positioned in the housing 30. In addition, the opening shape of the through hole 32 is not limited to rectangular shape and may be square shape, another quadrilateral shape than rectangular shape, pentagonal shape or further polygonal shape, circular shape or elliptical shape.

In each of the through holes 32, one contact 20 is press-fitted. With this configuration, as many contacts 20 as the number of through holes 32 are held by the housing 30, specifically, are integrated with the housing 30. Of the contact 20 held in each of the through holes 32, an end portion on the board S side in the Z direction, i.e., lower end portion (specifically, joining portion 22) is exposed at the bottom surface 34 of the housing 30 via the through hole 32, as shown in FIG. 4. Namely, each contact 20 is disposed in the corresponding through hole 32 with the lower end of the contact 20 facing a surface of the board S from the lower end opening of the through hole 32.

The lower end of the contact 20 held in each through hole 32 may be situated at, for example, the same position as the bottom surface 34 of the housing 30 in the Z direction (see FIGS. 19 and 20).

The contact 20 includes a base portion 21, a joining portion 22, a pair of arm portions 23, and a pair of pinch portions 24, as shown in FIGS. 7, and 13 to 15. The contact 20 is constituted of a single member, and the respective portions of the contact 20 are formed by, for example, cutting and bending a single metal piece.

The base portion 21 is a plate piece portion having a rectangular shape in a front view and extends in the Z direction to constitute a supporting post of the contact 20. The joining portion 22 is a piece portion constituting the −Z side end portion, i.e., end portion on the board S side in the Z direction, of the contact 20, extending to the lower side from a lower end of the base portion 21, and forming a tongue shape in a front view. The joining portion 22 has a lateral width (length in the X direction) decreasing toward the lower end, and the largest width thereof is slightly longer than the lateral width (length in the X direction) of the through hole 32. With this configuration, when the contact 20 is fitted in the through hole 32, the X-directional opposite end portions of the joining portion 22 bite into an inner wall of the through hole 32. As a result, the contact 20 is press-fitted in the through hole 32.

With the contact 20 being held in the through hole 32, a lower end surface of the joining portion 22 is exposed at the bottom surface 34 of the housing 30 via the through hole 32, specifically, situated in the substantially same plane as the bottom surface 34 in the Z direction. With this configuration, the lower end surface of the joining portion 22 faces a surface of the board S when the connector 10 is fixed to (mounted on) the board S. As described above, the joining portion 22 of the contact 20, precisely, the lower end surface thereof forms an exposed portion and is exposed at the bottom surface 34 of the housing 30.

Figure 13:
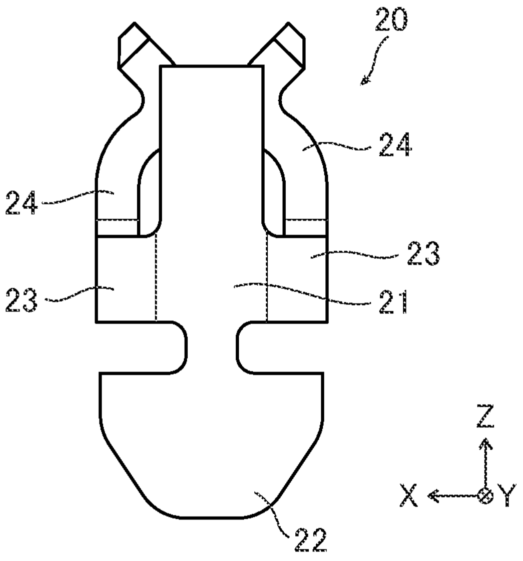
FIG. 13 is a front view of the contact according to the embodiment of the present invention.
Figure 14:
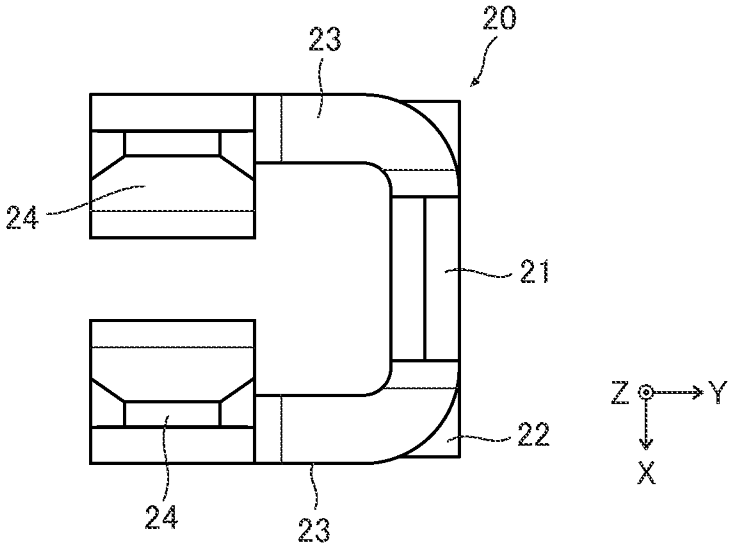
FIG. 14 is a plan view of the contact according to the embodiment of the present invention.

The pair of arm portions 23 are plate piece portions extending in the X direction from the X-directional opposite ends of the base portion 21 in an arm-like manner and positioned so as to sandwich the base portion 21 in the X direction as shown in FIGS. 13 and 14.

Figure 15:
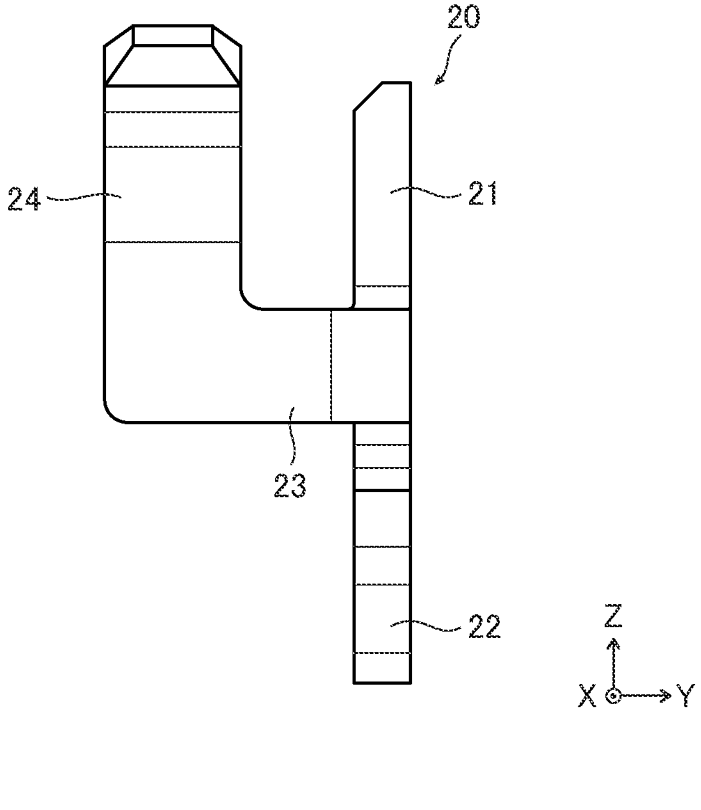
FIG. 15 is a side view of the contact according to the embodiment of the present invention.

The pair of pinch portions 24 are continuous with end portions of the pair of arm portions 23 and, as shown in FIG. 15, each form a portion extending from an end portion of each arm portion 23 to an upper side (+Z side). The pair of pinch portions 24 are aligned in the X direction and are formed to be symmetric with respect to a center line of the contact 20 in the X direction. Specifically, each of the pair of pinch portions 24 is bent in S-shape as shown in FIGS. 7 and 13. To be more specific, the end portions of the pinch portions 24 extend such that the gap between the pinch portions 24 is widened upward. Root portions of the pinch portions 24, on the other hand, extend such that the gap between the pinch portions 24 is narrowed downward.

In addition, each of the pair of pinch portions 24 has elasticity and is elastically deformable such that the gap between the pinch portions 24 can be enlarged. In the connector fitting state, as shown in FIG. 12, the pair of pinch portions 24 pinch an end portion of the counter contact 70. In other words, in the process of connector fitting, the end portion of the counter contact 70 enters between the pair of pinch portions 24, and the pinch portions 24 each elastically deform to be pushed outward in the X direction. Accordingly, the pair of pinch portions 24 pinch the end portion of the counter contact 70 to contact the counter contact 70. As a result, the contact 20 is brought into contact with and is physically and electrically connected to the corresponding counter contact 70.

Here, the position at which each of the pair of pinch portions 24 contacts the counter contact 70 corresponds to a contact point (hereinafter, referred to as unit contact point) of the contact 20 with the counter contact 70. In addition, since the respective contacts 20 are integrated with the housing 30, the respective contacts 20 have the contact points in the Z direction, more specifically, contact points with respect to the housing 30 at a substantially fixed position.

As shown in FIGS. 19 and 20, the movable terminals 50 along with the contacts 20 are separately disposed in the through holes 32 and are assembled to the housing 30 so as to be movable in the Z direction in the respective through holes 32. As many movable terminals 50 as the number of the contacts 20 are provided to the connector 10, and one movable terminal 50 is disposed in each one of the through holes 32. The movable terminal 50 is a separate member from the contact 20 and is movable in the Z direction with respect to the contact 20 within the through hole 32.

With the movable terminal 50 along with the contact 20 being disposed in the through hole 32, as shown in FIG. 21, there is an allowance (gap) between the movable terminal 50 and each neighboring component in the X direction and the Y direction. Specifically, an appropriate gap is provided between a portion, facing the movable terminal 50, of an inner wall surface of the through hole 32 and the movable terminal 50, and similarly, an appropriate gap is provided also between the movable terminal 50 and the contact 20. Because a gap (allowance) as above is provided between the movable terminal 50 and each neighboring component, the movable terminal 50 can smoothly move within the through hole 32 with respect to the contact 20.

Figure 16:
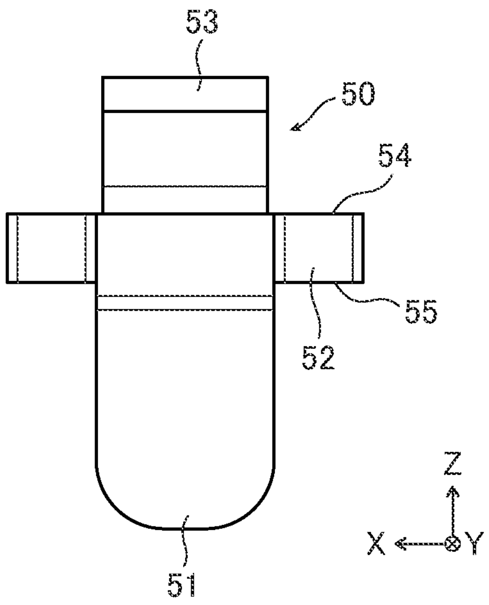
FIG. 16 is a front view of the movable terminal according to the embodiment of the present invention.
Figure 17:
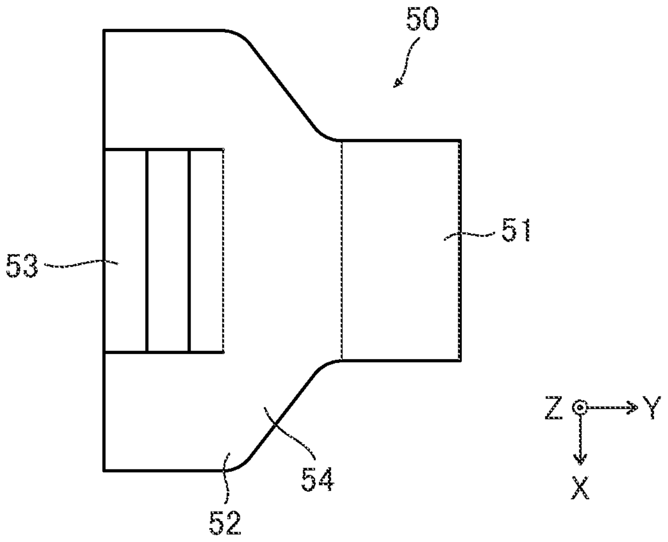
FIG. 17 is a plan view of the movable terminal according to the embodiment of the present invention.
Figure 18:
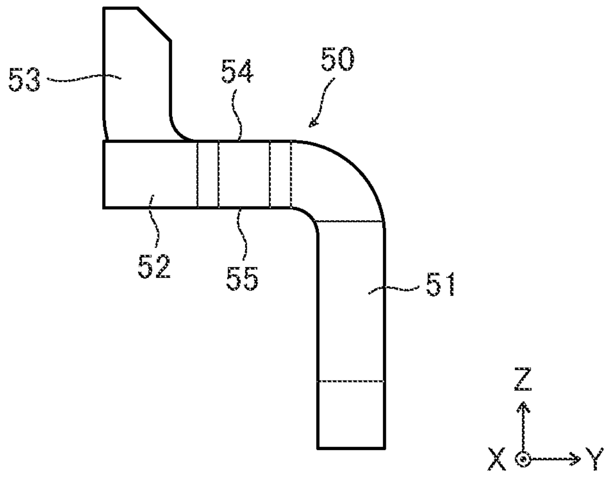
FIG. 18 is a side view of the movable terminal according to the embodiment of the present invention.

The movable terminal 50 is formed of a conductive material such as a metal piece bent in L-shape in a side view as shown in FIG. 18 and includes a contact portion 51, a continuation portion 52, and a protrusion portion 53 as shown in FIGS. 16 to 18.

The contact portion 51 is a plate-like portion extending downward in the Z direction (to the −Z side). With the movable terminal 50 along with the contact 20 being disposed in the through hole 32, the contact portion 51 is disposed at a close position to the joining portion 22 of the contact 20 in the Z direction. In other words, the movable terminal 50 is disposed at a close position to the contact 20 within the through hole 32. In this regard, the close position to the contact 20 may be a position at which the movable terminal 50 is in contact with the contact 20 or is adjacent to the contact 20 with a minute gap therebetween. The gap desirably has such a size that part of solder adhered to the contact portion 51 is sucked into the gap, and the size may be, for example, 0.2 mm or smaller.

Hereinbelow, it is supposed that the movable terminal 50 is disposed at a position adjacent to the contact 20 with a minute gap therebetween in the through hole 32.

A lower end portion (end portion on the board side in the Z direction) of the contact portion 51 is exposed at the bottom surface 34 of the housing 30 via the through hole 32. When the connector 10 is fixed to (mounted on) the board S, the lower end portion of the contact portion 51 is soldered to a surface of the board S. In addition, the lower end portion of the contact portion 51 before being fixed to the board S is configured to project from the bottom surface 34 via the lower end opening of the through hole 32 in accordance with movement of the movable terminal 50 in the Z direction (see FIGS. 2, 5 and 6).

In addition, an amount by which a tip end portion of each of the contact portions 51 projects from the bottom surface 34 in the Z direction, i.e., projection amount changes depending on the position of the movable terminal 50 in the Z direction as shown in FIGS. 19 and 20. In other words, the movable terminal 50 can move between a position at which the projection amount is maximum (hereinafter, referred to as maximum projection position) and a position at which the projection amount is minimum (hereinafter, referred to as minimum projection position) within the through hole 32.

Note that the position of the movable terminals 50 shown in FIG. 19 corresponds to the maximum projection position, while the position of the movable terminals 50 shown in FIG. 20 corresponds to the minimum projection position. The maximum projection position is a position at which the movable terminal 50 is situated closest to the board S in the Z direction, and the minimum projection position is a position at which the movable terminal 50 is situated farthest from the board S in the Z direction.

The continuation portion 52 is continuous with an upper end portion (end portion on the opposite side from the board S) of the contact portion 51 and is a plate-like portion provided to be vertical to the contact portion 51 and extending along the X direction. The lateral width (length in the X direction) of the continuation portion 52 is wider than the lateral width of the contact portion 51 as shown in FIGS. 16 and 17, and an upper end surface 54 and a lower end surface 55 of the continuation portion 52 are each a flat surface as shown in FIG. 18. The upper end surface 54 and the lower end surface 55 of the continuation portion 52 respectively correspond to a first end surface and a second end surface, situated on opposite sides from each other in the Z direction.

With the movable terminal 50 along with the contact 20 being disposed in the through hole 32, as shown in FIGS. 19 and 20, the continuation portion 52 is situated below the lower surface (i.e., on the board S side) of each of the pair of arm portions 23 of the contact 20. When the movable terminal 50 moves upward, i.e., to the opposite side from the board S in the Z direction, the upper end surface 54 of the continuation portion 52 can move until abutting the lower surface of each of the arm portions 23 and is restricted from moving further upward. That is, the lower surface of each of the pair of arm portions 23 works as a movement restriction portion of the contact 20. The lower surface of each of the pair of arm portions 23 abuts the movable terminal 50 when the movable terminal 50 moves along the Z direction in a direction to decrease the projection amount of the tip end portion of the contact portion 51 (i.e., to +Z side), whereby restricting movement of the movable terminal 50.

When the movable terminal 50 reaches a position at which the upper end surface 54 of the continuation portion 52 abuts the lower surface of each of the pair of arm portions 23 in the Z direction, the projection amount of the tip end portion of the contact portion 51 is minimized. In other words, the position at which the movable terminal 50 abuts the lower surface of each of the pair of arm portions 23 (i.e., position to contact the movement restriction portion) corresponds to the minimum projection position (see FIG. 20).

The lower surface of each of the pair of arm portions 23 serving as the movement restriction portion abuts the upper end surface 54 of the continuation portion 52, i.e., has surface contact with the movable terminal 50. With this configuration, each arm portion 23 can contact the movable terminal 50 well and can suitably restrict the movable terminal 50 from moving further upward. In addition, while the lower surface of each of the pair of arm portions 23 is used as the movement restriction portion, it is sufficient if upward movement of the movable terminal 50 can be restricted by contacting the movable terminal 50, and in such the case, a different movement restriction portion with another configuration than the foregoing may be used.

Furthermore, with the movable terminal 50 along with the contact 20 being disposed in the through hole 32, as shown in FIGS. 19 and 20, the continuation portion 52 is situated above a restriction portion 36 provided on an inner wall surface of the through hole 32 (i.e., on the opposite side from the board S). The restriction portion 36 is a protrusion portion, i.e., a step portion, the protrusion portion protruding in the Y direction from a lower region of a surface adjacent to the movable terminal 50 in the Y direction, among four surfaces constituting the inner wall surface of the through hole 32. The restriction portion 36 abuts the movable terminal 50 when the movable terminal 50 moves along the Z direction in a direction to increase the projection amount of the tip end portion of the contact portion 51 (i.e., to the −Z side). In other words, when moving downward in the Z direction, i.e., to the board S side, the movable terminal 50 can move until the lower end surface 55 of the continuation portion 52 abuts the restriction portion 36 and is restricted from moving further downward.

When the movable terminal 50 reaches a position at which the lower end surface 55 of the continuation portion 52 abuts the restriction portion 36 in the Z direction, the projection amount of the tip end portion of the contact portion 51 is maximized. In other words, the position at which the movable terminal 50 abuts the restriction portion 36 (i.e., position to contact the restriction portion 36) corresponds to the maximum projection position (see FIG. 19).

The restriction portion 36 includes an upper surface being a flat surface, which upper surface abuts the lower end surface 55 of the continuation portion 52, i.e., has surface contact with the movable terminal 50. With this configuration, the restriction portion 36 can contact the movable terminal 50 well and can suitably restrict the movable terminal 50 from moving further downward. In addition, while the above-described restriction portion 36 is constituted of a protrusion portion protruding from an inner wall surface of the through hole 32, it is sufficient if downward movement of the movable terminal 50 can be restricted by contacting the movable terminal 50, and in such the case, a different restriction portion with another configuration than the foregoing may be used.

As described above, each movable terminal 50 is disposed in the through hole 32 with the continuation portion 52 being positioned between the pair of arm portions 23 of the contact 20 and the restriction portion 36 in the Z direction. With this configuration, the movable terminal 50 can freely move between the minimum projection position and the maximum projection position in the Z direction until the lower end portion of the contact portion 51 is fixed to the board S. In addition, the movable terminal 50 can be prevented from falling out from the through hole 32. That is, the lower surface of each arm portion 23 and the restriction portion 36 work as a falling-out preventer for the movable terminal 50.

When the movable terminal 50 is at the minimum projection position, the lower end surface (end surface on the board S side) of the contact portion 51 is situated slightly above the contact surface 46 of the frame 40 in the Z direction as shown in FIG. 20. In other words, the lower end surface of the movable terminal 50 when the projection amount is minimized is positioned on the same side as the bottom surface 34 of the housing 30 as being viewed from the contact surface 46, e.g., positioned in the substantially same plane as the bottom surface 34. However, this is not the sole case, and the movable terminal 50 at the minimum projection position may have the lower end surface (end surface on the board S side) of the contact portion 51 positioned above (on the +Z side of) the bottom surface 34 of the housing 30. That is, the projection amount specified with reference to the bottom surface 34 of the housing 30 may have a negative value when the projection amount is minimized.

On the contrary, the movable terminal 50 at the maximum projection position has the lower end surface (end surface on the board S side) of the contact portion 51 positioned slightly below the contact surface 46 of the frame 40 in the Z direction as shown in FIG. 19. In other words, the lower end surface of the movable terminal 50 when the projection amount is maximized is positioned on the opposite side from the bottom surface 34 of the housing 30 as being viewed from the contact surface 46, specifically, positioned to be farthest from the bottom surface 34.

The protrusion portion 53 is a Y-directional end portion of the upper end surface 54 of the continuation portion 52, specifically, a portion protruding to the +Z side from an end portion opposite from the contact portion 51 in the Y direction. With the movable terminal 50 along with the contact 20 being disposed in the through hole 32, the protrusion portion 53 is positioned between the pair of arm portions 23 of the contact 20 in the X direction (see FIG. 12). The protrusion portion 53 is a portion that is formed in the process of forming the movable terminal 50; the protrusion portion 53 is not necessarily provided to the movable terminal 50.

<<Fixation of Connector to Board>>

Described next is the process of fixing (mounting) the connector 10 configured as above to (on) the board S. First, the connector 10 is held such that the Z direction coincides with the vertical direction and, in this state, is disposed on the board S. In this process, the bottom surface 34 of the housing 30 faces downward in the vertical direction. In addition, as shown in FIG. 19, the movable terminals 50 are lowered to the maximum projection portion due to their own weights.

When the connector 10 is mounted on a surface of the board S, the contact surface 46 provided at the lower surface of the frame 40 comes into contact with a surface, specifically, a pad (conductive pattern) that is not shown, of the board S. Subsequently, the remaining part (hereinafter, referred to as connector body) of the connector 10 excluding the movable terminals 50 falls toward the board S due to its own weight. In accordance with the fall of the connector body, the movable terminals 50 that have been situated at the maximum projection position move upward relative to the connector body including the contacts 20. That is, the projection amount of the contact portions 51 of the movable terminals 50 decreases. In this process, the movable terminals 50 can be easily moved relative to the contacts 20 without the need to press the connector body itself downward.

When the board S has no warpage or the like so that a surface of the board S is perpendicular to the vertical direction and flat, the projection amount of the contact portion 51 is unvaried among the respective movable terminals 50. Specifically, the lower surfaces of the contact portions 51 of the respective movable terminals 50 are substantially aligned at the same position as the contact surface 46 in the Z direction.

On the other hand, when the board S has warpage or the like so that the contact position between the board S and the movable terminal 50 changes in the Z direction (vertical direction) depending on each part of the board S, the movable terminal 50 moves to follow the positional change of each part of the board S, whereby the projection amount is adjusted for each movable terminal 50. With this configuration, even when the board S has warpage or the like, the lower surface of the contact portion 51 of each movable terminal 50 can be brought into contact with the board S.

Thereafter, the contact portion 51 of each movable terminal 50 is fixed to the board S with solder. In this process, part of the solder adhered to the contact portion 51 enters a minute gap between the contact portion 51 and the joining portion 22 of the contact 20 adjacent to the contact portion 51. The joining portion 22 is joined to the contact portion 51 with the solder that has entered this gap. Thus, the contacts 20 are electrically connected to the board S via the movable terminals 50 to achieve the electrically connected state.

In the connector 10 fixed to (mounted on) the board S by the foregoing procedure, the position of each movable terminal 50, i.e., the projection amount of each movable terminal 50 is adjusted. On the other hand, the respective contacts 20 are integrated with the housing 30, and with the connector 10 being fixed to the board S, the position of each of the contacts 20 in the Z directional is fixed. That is, the contact point of each contact 20 is situated at a predetermined position in the Z direction, and therefore, a certain effective contact length can be ensured in each contact 20. Here, the effective contact length means a length of a portion of the contact 20 in which the contact 20 can contact the counter contact 70 in the Z direction.

The above-described configuration allows the connector 10 to be fixed to the board S while following warpage or the like of the board S and can reduce the size of the connector 10.

Specifically, with the configuration in which the contact 5 moves to follow warpage or the like of the board S as shown in Patent Literature 1, the contact point moves in accordance with movement of the contact 5. In order to ensure the effective contact length in that configuration, the contact 5 and the counter contact each need to have a larger length (entire length) in the Z direction in consideration of a positional shift of the contact point. As a result, the connector and the counter connector are enlarged in the Z direction.

In addition, for movement of the contact 5, it is necessary to provide an allowance (gap) between the contact 5 and its surrounding component in each of the X direction and the Y direction. In this case, the contact 5 can shift in the X direction and the Y direction within the range of the allowance (gap) and would loosen and wobble. Accordingly, when the contact 5 is finally fixed to the board, the fixing position can be displaced in the X direction and the Y direction. In view of the foregoing, the respective portions of the contact 5 need to be designed in anticipation of displacement of the fixing position (wobbling amount). In particular, it is required to design such that the pair of pinch portions of the contact 5 have a wider distance therebetween or have a smaller spring constant to be more elastically deformable so that the contact 5 can contact the counter contact even if the fixing position is displaced. As a result, the connector configured such that the contact 5 is allowed to move can possibly be enlarged in the X direction and the Y direction.

In the connector 10 of the invention, on the other hand, the contact 20 itself does not move relative to the housing 30, and the movable terminal 50 moves instead relative to the contact 20. In other words, since the contact 20 does not move in the Z direction, it is not required to design the contact 20 and the counter contact 70 to have a longer length in order to ensure the effective contact length. As a result, enlargement of the connector 10 and the counter connector 60 in the Z direction is suppressed, and the connector 10 can be suitably fixed to (mounted on) the board S while following warpage or the like of the board S.

In addition, since the contact 20 does not move, it is not required to provide an allowance (gap) between the contact 20 and its surrounding component in each of the X direction and the Y direction. Accordingly, the disadvantage due to provision of an allowance in the vicinity of the contact, that is, enlargement of the connector in the X direction and the Y direction can be avoided.

<<Configuration of Counter Connector>>

Figure 22:
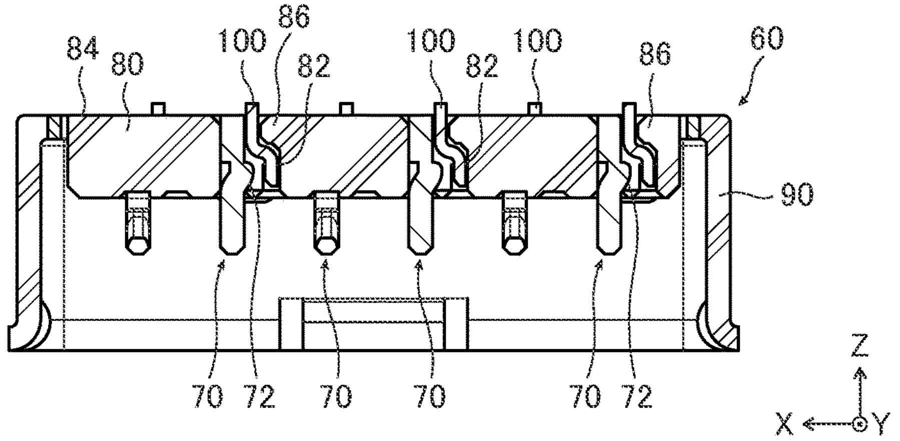
FIG. 22 is a view showing a cross-section taken along K-K in FIG. 9 and is a view showing a state where a projection amount of the movable terminal is maximum.
Figure 23:
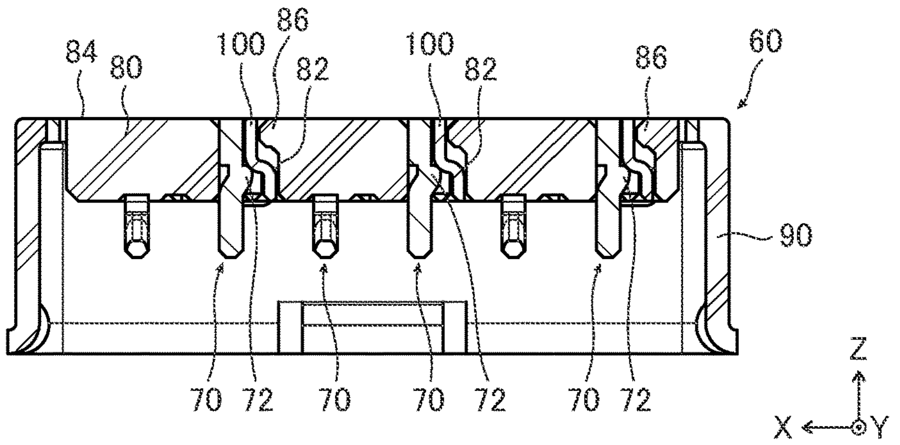
FIG. 23 is a view showing a cross-section taken along K-K in FIG. 9 and is a view showing a state where a projection amount of the movable terminal is minimum.
Figure 24:
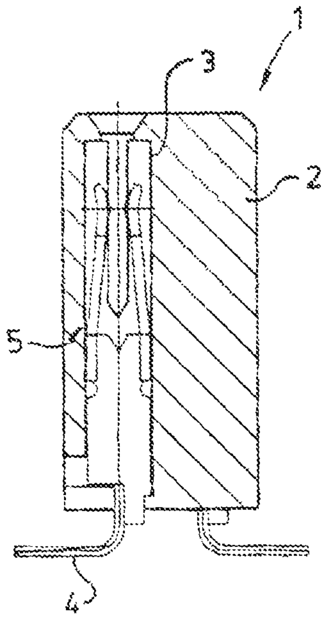
FIG. 24 PRIOR ART
FIG. 24 is a view showing a cross-section of a conventional connector in which a contact is configured to be movable.

The configuration of the connector 10 described above is adaptable for the counter connector 60. That is, the invention can realize the counter connector 60 which can be suitably fixed to a board and whose size is further reduced. The configuration of the counter connector 60 in this case is described with reference to the foregoing FIG. 10 and FIGS. 22 and 23. FIGS. 22 and 23 each illustrate a cross-section taken along K-K in FIG. 9, i.e., cross-section (XZ plane) passing the counter contacts 70 and counter movable terminals 100.

The counter connector 60 shown in FIGS. 9, 22 and 23 is provided with movable terminals (counter movable terminals 100) formed as separate members from the counter contacts 70. As shown in FIGS. 22 and 23, each of the movable terminals 100 is disposed in a through hole 82 of a counter housing 80 at a close position to the counter contact 70 and is movable in the Z direction relative to the counter contact 70 within the through hole 82.

An end portion in the Z direction (+Z side end portion) of the counter movable terminal 100 is configured so as to project from a bottom surface 84 of the counter housing 80 in accordance with movement of the counter movable terminal 100. The projection amount of the +Z side end portion of the counter movable terminal 100 changes depending on the position of the counter movable terminal 100 in the Z direction as shown in FIGS. 22 and 23. When the counter connector 60 is fixed to a board, the +Z side end portion of the counter movable terminal 100 is soldered to the board.

The counter connector 60 configured as above can achieve the similar effect to the effect exhibited by the foregoing connector 10.

In addition, as shown in FIG. 10, the counter contact 70 may be provided with a movement restriction portion 72. Consequently, the counter movable terminal 100 may be caused to abut the movement restriction portion 72 as shown in FIG. 23 to restrict its further movement (to the −Z side) from the abutting position. Moreover, as shown in FIG. 22, the counter housing 80 may be provided with a restriction portion 86 projecting in the X direction or the Y direction from an inner wall surface of the through hole 82. Consequently, the counter movable terminal 100 may be caused to abut the restriction portion 86 to restrict its further movement (to the +Z side) from the abutting position. Since the movement restriction portion 72 and the restriction portion 86 are provided, the counter movable terminal 100 can be prevented from falling out from the through hole 82.

Other Embodiments

While the connector of the invention has been described above with reference to a specific example, the foregoing embodiment is a mere example used to facilitate the understanding of the invention, and there may be other embodiments.

In the foregoing embodiment, the contact 20 is press-fitted in the through hole 32 provided to the housing 30 to be thereby held in the through hole 32. This is not the sole case, and for example, a housing having a contact integrated therewith may be formed by insert molding where a resin to form the housing is inserted into a mold (not shown) with the contact being disposed in the mold. In this case, part of the contact is embedded in an edge portion of a through hole of the housing, whereby the contact is held in the through hole.

In addition, in the foregoing embodiment, the movable terminal 50 includes the continuation portion 52, and in the through hole 32, the continuation portion 52 is situated between the pair of arm portions 23 of the contact 20 and the restriction portion 36 in the Z direction. With this configuration, the movable terminal 50 can be prevented from falling out from the through hole 32. Meanwhile, the configuration with which the movable terminal 50 is prevented from falling out from the through hole 32 is not limited to the above-described constitution and may adopt a lance structure, for example.

In addition, in the foregoing embodiment, a plurality of contacts 20 are provided, and as many movable terminals 50 and through holes 32 of the housing 30 as the number of contacts 20 are provided. Meanwhile, the numbers thereof are not limited thereto, and it may be configured such that only one contact 20, one movable terminal 50 and one through hole 32 are provided.

In addition, in the foregoing embodiment, the frame 40 as a contact member comes in contact with the board S at a different position from the movable terminal 50 when the frame 40 is fixed to the board S. Besides, the end portion of the frame 40 on the board side in the Z direction is provided with the contact surface 46 that comes in contact with the board S (see FIGS. 2 and 4). Meanwhile, this is not the sole case, and for example, in the connector 10 including no frame 40, the housing 30 may serve as a contact member and come in contact with the board S at a different position from the movable terminal 50. In other words, the housing 30 may be provided with a surface corresponding to the contact surface 46.

What is claimed is:

1. A connector that is disposed on a board in a first direction and fixed to the board, the connector comprising:
   - a housing provided with a bottom surface facing the board and a through hole formed along the first direction,
   - a contact held in the through hole and having its end portion on a board side in the first direction exposed at the bottom surface via the through hole, and
   - a movable terminal formed as a separate member from the contact, disposed at a close position to the contact in the through hole, and movable in the first direction relative to the contact,
   - wherein one end of the movable terminal in the first direction is configured so as to be fixed to the board and to project from the bottom surface in accordance with movement of the movable terminal,
   - wherein a projection amount of the one end changes depending on a position of the movable terminal in the first direction,
   - wherein the contact includes a movement restriction portion restricting movement of the movable terminal, and
   - wherein the movement restriction portion abuts the movable terminal to restrict movement of the movable terminal when the movable terminal moves along the first direction in a direction to decrease the projection amount,
   - the connector further comprising a restriction portion provided to an inner wall surface of the through hole and restricting movement of the movable terminal,
   - wherein the restriction portion abuts the movable terminal to restrict movement of the movable terminal when the movable terminal moves along the first direction in a direction to increase the projection amount,
   - wherein the movable terminal includes a contact portion extending in the first direction, and a continuation portion continuous with an end portion of the contact portion in the first direction,
   - wherein an end portion of the contact portion on a board side is fixed to the board and projects from the bottom surface in accordance with movement of the movable terminal, and
   - wherein the movable terminal is disposed in the through hole with the continuation portion being positioned between the movement restriction portion and the restriction portion in the first direction.

2. The connector according to claim 1, comprising a plurality of the contacts and a same number of the movable terminals as the contacts, wherein in the housing, the through hole is formed for each of the contacts.

3. The connector according to claim 2, wherein the contact includes a movement restriction portion restricting movement of the movable terminal, and wherein the movement restriction portion abuts the movable terminal to restrict movement of the movable terminal when the movable terminal moves along the first direction in a direction to decrease the projection amount.

4. The connector according to claim 3, comprising a restriction portion provided to an inner wall surface of the through hole and restricting movement of the movable terminal, wherein the restriction portion abuts the movable terminal to restrict movement of the movable terminal when the movable terminal moves along the first direction in a direction to increase the projection amount.

5. The connector according to claim 4, wherein the movable terminal includes a contact portion extending in the first direction, and a continuation portion continuous with an end portion of the contact portion in the first direction, wherein an end portion of the contact portion on a board side is fixed to the board and projects from the bottom surface in accordance with movement of the movable terminal, and wherein the movable terminal is disposed in the through hole with the continuation portion being positioned between the movement restriction portion and the restriction portion in the first direction.

6. The connector according to claim 1, wherein the contact includes a joining portion constituting the end portion on a board side in the first direction, wherein the one end of the movable terminal is fixed to the board with solder, and wherein part of the solder enters a gap between the one end of the movable terminal and the joining portion, thereby joining the one end of the movable terminal to the joining portion.

7. The connector according to claim 6, wherein the contact includes a movement restriction portion restricting movement of the movable terminal, and wherein the movement restriction portion abuts the movable terminal to restrict movement of the movable terminal when the movable terminal moves along the first direction in a direction to decrease the projection amount.

8. The connector according to claim 7, comprising a restriction portion provided to an inner wall surface of the through hole and restricting movement of the movable terminal, wherein the restriction portion abuts the movable terminal to restrict movement of the movable terminal when the movable terminal moves along the first direction in a direction to increase the projection amount.

9. The connector according to claim 8, wherein the movable terminal includes a contact portion extending in the first direction, and a continuation portion continuous with an end portion of the contact portion in the first direction, wherein an end portion of the contact portion on a board side is fixed to the board and projects from the bottom surface in accordance with movement of the movable terminal, and wherein the movable terminal is disposed in the through hole with the continuation portion being positioned between the movement restriction portion and the restriction portion in the first direction.

10. The connector according to claim 1, wherein a contact member of the connector contacting the board at a different position from the movable terminal when the connector is fixed to the board includes, at its end portion on a board side in the first direction, a contact surface to contact the board, wherein, when the movable terminal is moved farthest from the board in the first direction, an end surface of the movable terminal on a board side is positioned on a same side as the bottom surface when viewed from the contact surface, and wherein, when the movable terminal is moved closest to the board in the first direction, the end surface of the movable terminal on a board side is positioned on an opposite side from the bottom surface when viewed from the contact surface.

11. The connector according to claim 1, wherein, in a second direction intersecting the first direction, a gap is provided each between the movable terminal and a portion of an inner wall surface of the through hole, the portion facing the movable terminal, and between the movable terminal and the contact.

12. The connector according to claim 1, wherein the connector is fittable with a counter connector in the first direction, wherein the contact includes a pair of pinch portions aligned in the second direction intersecting the first direction, and wherein, in a state where the connector is fitted with the counter connector, the pair of pinch portions pinch a counter contact of the counter connector.

* * * * *